United States Patent
Perko

(10) Patent No.: US 10,818,187 B2
(45) Date of Patent: Oct. 27, 2020

(54) SYSTEMS AND METHODS FOR DEPLOYING AN AUTONOMOUS VEHICLE TO OVERSEE AUTONOMOUS NAVIGATION

(71) Applicant: UATC, LLC, San Francisco, CA (US)

(72) Inventor: Eric Michael Perko, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 273 days.

(21) Appl. No.: 15/651,362

(22) Filed: Jul. 17, 2017

(65) Prior Publication Data

US 2019/0019416 A1   Jan. 17, 2019

(51) Int. Cl.
*G08G 1/00* (2006.01)
*G05D 1/00* (2006.01)

(52) U.S. Cl.
CPC .......... *G08G 1/202* (2013.01); *G05D 1/0011* (2013.01); *G05D 1/0088* (2013.01)

(58) Field of Classification Search
None
See application file for complete search history.

(56) References Cited

U.S. PATENT DOCUMENTS

| | | | | |
|---|---|---|---|---|
| 9,760,092 B2* | 9/2017 | Ferguson | ................. | B60R 1/00 |
| 9,922,553 B2* | 3/2018 | McErlean | ............... | B60K 35/00 |
| 10,121,376 B2* | 11/2018 | She | ....................... | G08G 1/166 |
| 10,185,327 B1* | 1/2019 | Konrardy | ............... | G07C 5/008 |
| 2010/0214085 A1* | 8/2010 | Avery | .................... | G08G 1/161 |
| | | | | 340/435 |
| 2015/0178998 A1* | 6/2015 | Attard | .................... | G07C 5/008 |
| | | | | 701/23 |
| 2017/0278312 A1* | 9/2017 | Minster | ................ | G05D 1/0297 |
| 2018/0096602 A1* | 4/2018 | She | ....................... | B60W 10/20 |
| 2018/0188738 A1* | 7/2018 | Tatourian | ............. | G05D 1/0234 |
| 2018/0218607 A1* | 8/2018 | Baghel | .................. | H04W 88/04 |
| 2018/0224844 A1* | 8/2018 | Zhang | ................... | G05D 1/005 |
| 2018/0342153 A1* | 11/2018 | Ellis | ...................... | G08G 1/005 |

\* cited by examiner

*Primary Examiner* — Dale W Hilgendorf
*Assistant Examiner* — Alexander C. Bost
(74) *Attorney, Agent, or Firm* — Dority & Manning, PA

(57) ABSTRACT

Systems and methods for controlling an autonomous vehicle to assist another autonomous vehicle are provided. In one example embodiment, a computer-implemented method includes obtaining data representing a vehicle route of a first autonomous vehicle, wherein the first autonomous vehicle travels along the vehicle route from a first location to a second location. The method includes obtaining data representing an occlusion point that affects an operation of the first autonomous vehicle along the vehicle route. The method includes selecting a second autonomous vehicle, based at least in part on (i) the vehicle route and (ii) the occlusion point, to assist the first autonomous vehicle. The method includes deploying the second autonomous vehicle to assist the first autonomous vehicle to travel along the vehicle route.

20 Claims, 9 Drawing Sheets

SYSTEMS AND METHODS FOR DEPLOYING AN AUTONOMOUS VEHICLE TO OVERSEE AUTONOMOUS NAVIGATION

FIELD

The present disclosure relates generally to deploying an autonomous vehicle to oversee autonomous navigation maneuvers of another autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment. However, in some situations one or more objects in the surrounding environment can occlude the sensors of the autonomous vehicle. In other situations, one or more objects in the surrounding environment can occlude a motion of the autonomous vehicle.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle to assist another autonomous vehicle. The method includes obtaining, by a computing system comprising one or more computing devices, data representing a vehicle route of a first autonomous vehicle, wherein the first autonomous vehicle travels along the vehicle route from a first location to a second location. The method includes obtaining, by the computing system, data representing an occlusion point that affects an operation of the first autonomous vehicle along the vehicle route. The method includes selecting, by the computing system, and based at least in part on (i) the vehicle route and (ii) the occlusion point, a second autonomous vehicle to assist the first autonomous vehicle. The method includes deploying, by the computing system, the second autonomous vehicle to assist the first autonomous vehicle to travel along the vehicle route.

Another example aspect of the present disclosure is directed to a computing system for controlling an autonomous vehicle to assist another autonomous vehicle. The computing system includes one or more processors and one or more tangible, non-transitory, computer readable media that collectively store instructions that when executed by the one or more processors cause the computing system to perform operations. The operations include obtaining data representing a vehicle route of a first autonomous vehicle, wherein the first autonomous vehicle travels along the vehicle route from a first location to a second location. The operations include obtaining data representing an occlusion point that affects an operation of the first autonomous vehicle along the vehicle route. The operations include selecting, based at least in part on (i) the vehicle route and (ii) the occlusion point, a second autonomous vehicle to assist the first autonomous vehicle. The operations include deploying the second autonomous vehicle to assist the first autonomous vehicle to travel along the vehicle route.

Yet another example aspect of the present disclosure is directed to an autonomous vehicle. The autonomous vehicle includes one or more vehicle input devices. The autonomous vehicle includes one or more processors and one or more tangible, non-transitory, computer readable media that collectively store instructions that when executed by the one or more processors cause the autonomous vehicle to perform operations. The operations include obtaining data representing a vehicle route of a first autonomous vehicle, wherein the first autonomous vehicle travels along the vehicle route from a first location to a second location. The operations include obtaining data representing an occlusion point that affects an operation of the first autonomous vehicle along the vehicle route. The operations include selecting, based at least in part on (i) the vehicle route and (ii) the occlusion point, a second autonomous vehicle to assist the first autonomous vehicle. The operations include deploying the second autonomous vehicle to assist the first autonomous vehicle to travel along the vehicle route.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

Figure 1:
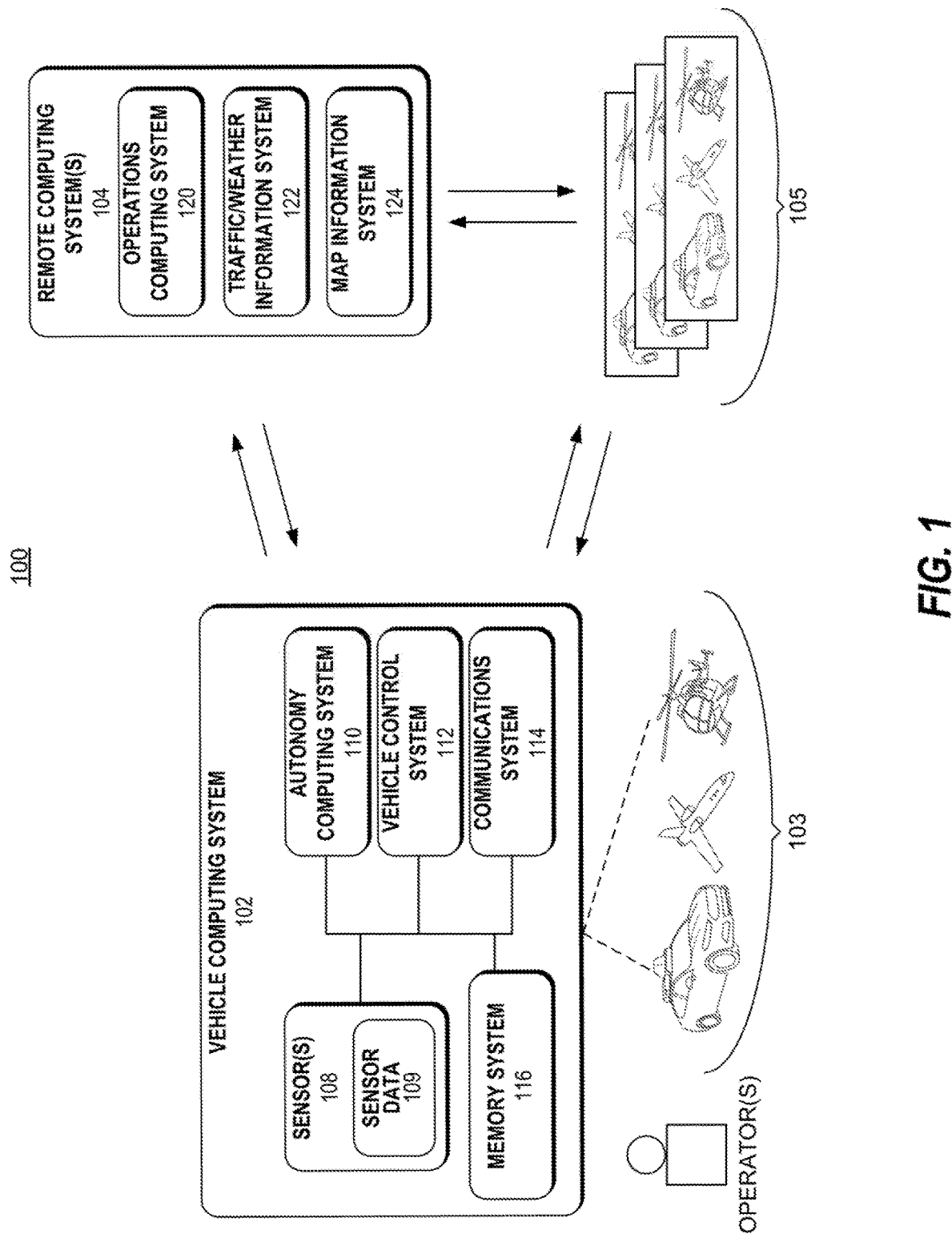
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure.

In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to navigating an autonomous vehicle past an object that occludes the autonomous vehicle. An autonomous vehicle can autonomously navigate through a surrounding environment by executing a motion plan including one or more maneuver(s) that cause the autonomous vehicle to travel along a vehicle route from an origin to a destination. At one or more location(s) (e.g., occlusion point(s)) along the vehicle route, one or more maneuver(s) of the autonomous vehicle can be occluded by one or more object(s) (e.g., occlusion object(s)) in the surrounding environment. The occlusion object(s) can include, for example, other vehicles, bicyclists, pedestrians, road hazards (e.g., potholes, puddles, debris, etc.), precipitation (e.g., rain, snow, fog, etc.), and/or terrain features (e.g., hills, blind-corners, etc.). The present disclosure enables an identification of one or more occlusion point(s) corresponding to an occluded autonomous vehicle. Each identified occlusion point can indicate a geographic location corresponding to a maneuver of the autonomous vehicle that is occluded by an occluding object (e.g., an occluded field of view of the sensor(s) of an autonomous vehicle to perform the maneuver). The present disclosure also enables a selection and deployment of a designated autonomous vehicle to assist in safely navigating an occluded autonomous vehicle past an occlusion point corresponding to the occluded autonomous vehicle.

For example, a maneuver of an occluded autonomous vehicle can include travelling over a hill. A geographic location of the maneuver can be identified as an occlusion point because when the autonomous vehicle is climbing one side of the hill, the hill occludes the other side from one or more sensor(s) of the autonomous vehicle. A designated autonomous vehicle can be selected and deployed to the occluded side of the hill to assist the occluded autonomous vehicle in safely navigating over the hill.

As another example, a maneuver of an occluded autonomous vehicle can include travelling around a blind-corner. A geographic location of the maneuver can be identified as an occlusion point because when the occluded autonomous vehicle is turning the blind-corner, the other side is occluded to one or more sensor(s) of the occluded autonomous vehicle. A designated autonomous vehicle can be selected and deployed to the other side of the blind-corner to assist the occluded autonomous vehicle in safely navigating around the blind-corner.

As yet another example, a maneuver of an occluded autonomous vehicle can include travelling in a weather condition. A geographic location of the maneuver can be identified as an occlusion point because when the autonomous vehicle is travelling through a surrounding environment affected by the weather condition, the weather condition (e.g., rain, sleet, snow, etc.) can reduce a range, resolution, quality, etc. associated with data obtained by one or more sensor(s) of the occluded autonomous vehicle, the data indicative of the surrounding environment. In some implementations, a weather condition can be one or more properties of the surrounding environment. For example, the weather condition can include a temperature, humidity, etc. of the air in the surrounding environment. The temperature, humidity, etc. can reduce a range, resolution, quality, etc. associated with data obtained by the one or more sensor(s). A designated autonomous vehicle can be selected and deployed to a vicinity of the surrounding environment affected by the weather condition, to assist the occluded autonomous vehicle to safely navigate the weather condition.

As yet another example, a maneuver of an occluded autonomous vehicle can include a lane-change or an unprotected-left-turn maneuver. A geographic location of the maneuver can be identified as an occlusion point if one or more object(s) at the geographic location (e.g., other vehicles, bicyclists, pedestrians, road hazards, etc.) occlude the autonomous vehicle from executing the maneuver (e.g., occlude a sensor field of view associated therewith). A designated autonomous vehicle can be selected and deployed to the geographic location of the maneuver to provide a leeway for the occluded autonomous vehicle to safely execute the maneuver.

In some implementations, a maneuver of an occluded autonomous vehicle can be occluded by one or more technical capabilities or design limitations of a sensor associated with the autonomous vehicle. For example, a certain sensor on-board the autonomous vehicle can have a maximum range (e.g., of three-hundred meters), but additional sensor information beyond the maximum range can be required to safely execute the maneuver. A designated autonomous vehicle can be selected and deployed to a geographic location outside the maximum range, and provide the occluded autonomous vehicle with data indicative of a surrounding environment at the geographic location outside the maximum range. The designated autonomous vehicle can provide the data to assist the occluded autonomous vehicle to safely execute the maneuver.

An autonomous vehicle can include a vehicle computing system that implements a variety of systems on-board the autonomous vehicle (e.g., located on or within the autonomous vehicle). For instance, the vehicle computing system can include an autonomy computing system (e.g., for planning and executing autonomous navigation), vehicle control system (e.g., for controlling one or more systems responsible for powertrain, steering, braking, etc.), communications system (e.g., for communicating with one or more other computing system(s)), and memory system (e.g., for storing a motion plan of the autonomous vehicle, map information, traffic/weather information, etc.). Other autonomous vehicles described herein can be configured in a similar manner.

An autonomy computing system of the autonomous vehicle can include one or more system(s) for planning and executing autonomous navigation. For instance, the autonomy computing system can include, among other systems, a perception system, a prediction system, and a motion planning system that cooperate to navigate the autonomous vehicle through a surrounding environment. The autonomy computing system can determine a vehicle route from an origin to a destination, and a motion plan to navigate along the vehicle route. In some implementations, the autonomy computing system can obtain a vehicle route from one or more system(s) on-board the autonomous vehicle, or from one or more remote computing system(s). The autonomy computing system can obtain sensor data indicative of the surrounding environment of the autonomous vehicle from one or more sensor(s) (e.g., a Light Detection and Ranging (LIDAR) system, a Radio Detection and Ranging (RADAR) system, one or more cameras (e.g., visible spectrum cameras, infrared cameras, etc.), motion sensors, and/or other types of image capture devices and/or sensors) on-board the autonomous vehicle, and adjust the motion plan based on the sensor data. The motion plan can include one or more maneuver(s) that cause the autonomous vehicle to travel along the vehicle route when the maneuver(s) are executed. The autonomy computing system can execute the maneuver(s) in the motion plan by determining one or more vehicle control signal(s) corresponding to each maneuver, and providing the vehicle control signal(s) to a vehicle control system of the autonomous vehicle.

A vehicle control system of the autonomous vehicle can include one or more system(s) for controlling the autonomous vehicle. For instance, the vehicle control system can include a powertrain control system, steering control system, braking control system, etc. The vehicle control system can receive one or more vehicle control signal(s) from one or more system(s) on-board the autonomous vehicle. The vehicle control system can instruct the powertrain control system, steering control system, braking control system, etc. to control the autonomous vehicle according to the vehicle control signal(s), for example, in the manner described herein to implement autonomous navigation.

A communications system of the autonomous vehicle can include one or more system(s) for communicating with one or more remote computing system(s) that are remote from the autonomous vehicle. For instance, the communications system can include transmitters, receivers, ports, controllers, antennas, or other suitable components that can help facilitate communication with the remote computing system(s). The remote computing system(s) can include, for example, an operations computing system (e.g., for remotely managing the autonomous vehicle), map information system (e.g., for obtaining map information of the environment), traffic/weather information system (e.g., for obtaining traffic/weather information of the environment), vehicle computing system(s) associated with other autonomous vehicle(s), and/or other systems.

A memory system of the autonomous vehicle can include one or more memory devices located at the same or different locations (e.g., on-board the vehicle, distributed throughout the vehicle, off-board the vehicle, etc.). The memory system can store and/or retrieve data. For example, an autonomous vehicle can store data indicative of a planned vehicle route, motion plan, occlusion point(s), etc. in the memory system. As another example, an autonomous vehicle can retrieve data indicative of a map, traffic/weather, and/or predetermined occlusion point(s) stored in the memory system.

A computing system can identify one or more occlusion points(s) corresponding to an occluded autonomous vehicle, and deploy a designated autonomous vehicle to assist the occluded autonomous vehicle to safely navigate past the occlusion point(s). The computing system can be a vehicle computing system associated with the occluded autonomous vehicle or a remote computing system that is remote from the occluded autonomous vehicle (e.g., operations computing system, vehicle computing system of another autonomous vehicle, etc.).

A computing system can identify one or more occlusion point(s) corresponding to an occluded autonomous vehicle based at least in part on data indicative of a surrounding environment along a vehicle route of the occluded autonomous vehicle. The data indicative of the surrounding environment can include sensor data acquired by the computing system, sensor data acquired by another computing system, map data, traffic data, weather data, predetermined occlusion point data, etc. (e.g., occlusion data). By way of example, a computing system can obtain sensor data indicative of a surrounding environment of the occluded autonomous vehicle from one or more sensor(s) on-board the occluded autonomous vehicle or one or more sensor(s) on-board another autonomous vehicle. The computing system can analyze the sensor data to identify one or more object(s) in the surrounding environment that occlude a maneuver of the occluded autonomous vehicle.

A computing system can obtain map data, traffic data, and weather data indicative of a surrounding environment of the occluded autonomous vehicle from one or more remote computing system(s). For example, the computing system can communicate with a map information system to obtain map data, and communicate with a traffic/weather information system to obtain traffic/weather data.

The map data can include a geographic layout of one or more types of infrastructure (e.g., roads, bridges, tunnels, parking, airports, etc.), a geographic location of one or more natural or artificial features (e.g., lakes, rivers, hills, mountains, buildings, etc.), and/or geographic characteristics (e.g., elevation, etc.). The computing system can analyze the map data to identify one or more geographic location(s) corresponding to one or more occluded maneuver(s) of an occluded autonomous vehicle.

The traffic/weather data can include traffic pattern(s), condition(s), alert(s), etc. (e.g., traffic information), and weather forecast(s), condition(s), alert(s), etc. (e.g., weather information). The traffic/weather data can include an identifier and a corresponding geographic location for each pattern, forecast, condition, alert, etc. For example, the traffic/weather data can indicate that that a large delivery truck blocks traffic on Gingerbread Ln. every Monday from 11:00 a.m. to 12:00 p.m. As another example, the traffic/weather data can indicate that a disabled vehicle at 41° 24'12.2"N and 2° 10'26.5"E is blocking a traffic lane. As yet another example, the traffic/weather data can indicate that a thunderstorm will reduce visibility over a ten mile stretch on interstate highway 1-85 beginning at mile marker fifteen. As yet another example, the traffic/weather data can indicate an amount of traffic associated with a particular location, in hourly increments. As yet another example, the traffic/weather data can indicate that a particular location is associated with a high number of accidents. The computing system can analyze the traffic/weather data to identify one or more geographic location(s) corresponding to one or more occluded maneuver(s) of an occluded autonomous vehicle.

A computing system can store each identified occlusion point in a memory system associated with the computing system as a predetermined occlusion point, and obtain data indicative of one or more predetermined occlusion point(s) that were identified by another computing system. The computing system can communicate with the one or more other computing system(s) to obtain data indicative of one or more occlusion point(s) identified by the other computing system(s). For example, a remote computing system (e.g., operations computing system, vehicle computing system of another autonomous vehicle) can obtain and analyze map or traffic/weather data to identify an occlusion point, and store the identified occlusion point in a memory system as a predetermined occlusion point. The computing system can communicate with the remote computing system and obtain data indicative of the predetermined occlusion point. The computing system can analyze the one or more occlusion point(s) indicated by the predetermined occlusion point data to verify that the occlusion point(s) correspond to the occluded autonomous vehicle.

A computing system can determine that a maneuver of an autonomous vehicle is occluded, for example, if the autonomous vehicle cannot safely execute the maneuver. A maneuver of the autonomous vehicle can include, for example, travelling along a road, over a hill, around a turn, changing a lane, etc. The maneuver can be occluded when an object prevents the autonomous vehicle from safely executing the maneuver. For example, an object at a location corresponding to a maneuver can occlude one or more sensor(s) on-board an autonomous vehicle such that the autonomous vehicle is unable to fully perceive the surrounding environment at the location, and therefore unable to safely execute the maneuver. As another example, an occluding object can occlude a motion of an autonomous vehicle such that the autonomous vehicle may be unable to execute a maneuver without a high probability of colliding with the occluding object or another object.

A computing system can determine that an object occludes a sensor of an autonomous vehicle if the sensor is unable to perceive one or more region(s) in a surrounding environment of the autonomous vehicle because of the object (e.g., occluded region(s)). For example, a computing system can determine that a hill, blind-corner, and/or precipitation occludes a sensor of an autonomous vehicle because the hill, blind-corner, and/or precipitation occludes one or more region(s) in the surrounding environment from the sensor of the autonomous vehicle. In particular, when the autonomous vehicle is climbing one side of the hill, the hill can occlude the opposite side from one or more sensor(s) of the autonomous vehicle; when the autonomous vehicle is turning the blind-corner, the blind-corner can occlude the other side from one or more sensor(s) of the autonomous vehicle; and when the autonomous vehicle is travelling in precipitation, the precipitation can occlude other object(s) in the surrounding environment from one or more sensor(s) of the autonomous vehicle. As a result, the autonomous vehicle may be unable to safely execute one or more maneuver(s) to navigate over the hill, around the blind-corner, or through the precipitation.

A computing system can determine that a motion of an autonomous vehicle is occluded if the autonomous vehicle is unable to safely execute a maneuver. An autonomous vehicle is unable to safely execute a maneuver if the maneuver is associated with a high probability of collision with one or more object(s) in a surrounding environment of the autonomous vehicle. For example, a computing system can determine that a lane-change maneuver of an autonomous vehicle is occluded by a car in a target lane of the lane-change maneuver because the autonomous vehicle cannot execute the lane-change maneuver because the maneuver is associated with a high probability of a collision with the car, or another object, in the surrounding environment of the autonomous vehicle. As another example, a computing system can determine that an unprotected-left-turn maneuver of an autonomous vehicle is occluded by a high volume of traffic in an opposing lane because the autonomous vehicle cannot make a left turn across the opposing lane without a high probability of hitting a vehicle in the opposing lane as.

A computing system can select a designated autonomous vehicle to assist the occluded autonomous vehicle. The designated autonomous vehicle can be from among a plurality of autonomous vehicles. In some implementations, the designated autonomous vehicle can be within a predetermined distance/time of an occlusion point corresponding to an occluded autonomous vehicle. The computing system can select the designated autonomous vehicle by prioritizing one or more vehicle characteristic(s) of the plurality of autonomous vehicles. For example, a computing system can prioritize selecting an unoccupied autonomous vehicle (e.g., a vehicle that is unoccupied with passengers riding the vehicle for a transportation service, unoccupied with items for a delivery/courier service, not assigned to a service request, etc.) from the plurality of autonomous vehicles. As another example, a computing system can prioritize selecting an unmanned aerial vehicle (e.g., drone) from the plurality of autonomous vehicles. As yet another example, a computing system can prioritize selecting a designated autonomous vehicle that has a shortest time-to-deploy (e.g., a duration of time until the designated autonomous vehicle reaches a location corresponding to the occlusion point to assist the occluded autonomous vehicle). The time-to-deploy can be proportional to a distance of the designated autonomous vehicle from the occlusion point, and/or can be based on factors other than the distance of the designated autonomous vehicle from the occlusion point (e.g., due to road, traffic, weather, etc.).

A computing system can deploy a designated autonomous vehicle to assist an occluded autonomous vehicle at a current or future time, based at least in part on one or more vehicle characteristic(s) associated with the occluded autonomous vehicle and the designated autonomous vehicle with respect to an occlusion point. The vehicle characteristic(s) of the occluded autonomous vehicle can include, for example, a time-to-occlusion, and occlusion-duration. The vehicle characteristic(s) of the designated autonomous vehicle can include, for example, the time-to-deploy.

The time-to-occlusion can indicate a duration of time until the occluded autonomous vehicle reaches a location corresponding to the occlusion point and the corresponding maneuver of the occluded autonomous vehicle is occluded. If the time-to-occlusion is "0," then the corresponding maneuver of the occluded autonomous vehicle is currently occluded. For example, an occlusion point that is located towards the end of a vehicle route of the occluded autonomous vehicle will have a greater time-to-occlusion than an occlusion point that is located towards the beginning of the vehicle route.

The occlusion-duration can indicate a duration of time that the occlusion point exists, if the occlusion point is time-dependent. For example, if an occlusion point is identified because of traffic or weather conditions, then the occlusion point can exist for a duration of the traffic or weather condition. In this case, the occlusion-time can be set as a duration of time from the start of the time-to-occlusion until the occlusion point expires. As another example, an occlusion point that is identified because of a hill or blind-corner continues to exist unless the vehicle route of the occluded autonomous vehicle is modified. In this case, the occlusion-time can be set to "0" to indicate an indefinite or unable to be determined duration of time.

If the time-to-occlusion is greater than the time-to-deploy, then the designated autonomous vehicle can be deployed at a current time or while the time-to-occlusion is greater than or equal to the time-to-deploy. For example, if the time-to-occlusion is 10 minutes and the time-to-deploy is 5 minutes, then the designated autonomous vehicle can be deployed so that the designated autonomous vehicle arrives at a vicinity of the occlusion point at or before the occluded autonomous vehicle arrives at a vicinity of the occlusion point.

If the time-to-occlusion is less than the time-to-deploy, then the designated autonomous vehicle can be deployed immediately to reduce a duration of time that the occluded autonomous vehicle is occluded at the occlusion point. For example, if the time-to-occlusion is 10 minutes and the time-to-deploy is 15 minutes, then the designated autonomous vehicle can be deployed immediately so that the occluded autonomous vehicle will be occluded for not longer than 5 minutes.

In some implementations, if the occlusion-time is greater than "0" (e.g., the occlusion-time is not indefinite or undeterminable), and the occlusion-time is less than or equal to the time-to-deploy, then the designated autonomous vehicle may not be deployed. For example, if the occlusion-time is 7 minutes, then in 7 minutes the occlusion point will expire. In this case, if the time-to-deploy is equal to or greater than 7 minutes, then the occlusion point will expire at or before the designated autonomous vehicle arrives at a vicinity of the occlusion point.

A computing system can deploy a designated autonomous vehicle in response to an identification of an occlusion point corresponding to an occluded autonomous vehicle, and/or in response to a request for assistance. For example, a computing system that identifies an occlusion point corresponding to an occluded autonomous vehicle can select and deploy a designated autonomous vehicle to assist the occluded autonomous vehicle with respect to the occlusion point. As another example, a computing system (e.g., an operations computing system, computing system of another vehicle) can receive data indicative of a request for assistance, and in response the computing system can select and deploy a designated autonomous vehicle. The request for assistance can include an identification of the occluded autonomous vehicle (e.g., a unique identifier associated with the vehicle) and an occlusion point (e.g., a location specified by a latitude-longitude coordinate). The request for assistance can be provided by the occluded autonomous vehicle (e.g., vehicle computing system associated with the occluded autonomous vehicle) or a remote computing system that is remote from the occluded autonomous vehicle (e.g., operations computing system, vehicle computing system associated with another autonomous vehicle). The computing system can communicate directly with the occluded autonomous vehicle to obtain data indicative of the request for assistance. Additionally, or alternatively, the occluded autonomous vehicle can provide data indicative of the request for assistance to a remote computing system, and the computing system can communicate with the remote computing system to obtain data indicative of the request for assistance.

A computing system can deploy a designated autonomous vehicle to a vicinity of an occlusion point, and instruct the designated autonomous vehicle to obtain data indicative of a surrounding environment at the occlusion point. In particular, the computing system can instruct the designated autonomous vehicle to obtain data corresponding to a region of the surrounding environment that is occluded to one or more sensor(s) of the occluded autonomous vehicle (e.g., occluded region(s)). The computing system can obtain data corresponding to the occluded region(s) from the designated autonomous vehicle and provide the data to the occluded autonomous vehicle. Additionally, or alternatively, the computing system can analyze the data corresponding to the occluded region(s) to determine if the occluded autonomous vehicle can safely execute an occluded maneuver. Additionally, or alternatively, the computing system can provide a "safe" or "unsafe" indication to the occluded autonomous vehicle to notify when the occluded autonomous vehicle can safely execute an occluded maneuver. In this way, the occluded autonomous vehicle can fully perceive the surrounding environment at the occlusion point and safely execute a maneuver to navigate past the occlusion point.

A computing system can instruct a designated autonomous vehicle to travel to a vicinity of an occlusion point via a route that is different than a route of an occluded autonomous vehicle. For example, if a route of an occluded autonomous vehicle indicates that the occluded autonomous vehicle will approach an occlusion point from the south, then a computing system can deploy a designated autonomous vehicle to approach the occlusion point from the north. As another example, if a route of an occluded autonomous vehicle indicates that the occluded autonomous vehicle will approach an occlusion point via a ground-based route, then a computing system can deploy a designated autonomous vehicle to approach the occlusion point by air or sea. As yet another example, if a vehicle route of an occluded autonomous vehicle indicates that the occluded autonomous vehicle will travel through a geographic area that is experiencing a weather condition, then a computing system can deploy a designated autonomous vehicle to patrol the geographic area. The designated autonomous vehicle can obtain sensor data corresponding to one or more object(s) in the geographic area that are occluded to the occluded autonomous vehicle by the weather condition, and provide data indicative of the one or more object(s) to the occluded autonomous vehicle.

A computing system can deploy a designated autonomous vehicle to a vicinity of an occlusion point, and instruct the designated autonomous vehicle to provide a leeway for an occluded autonomous vehicle to execute an occluded maneuver. For example, if a lane-change maneuver of an autonomous vehicle is occluded, then a designated autonomous vehicle can approach a geographic location of the lane-change maneuver from behind the occluded autonomous vehicle. The designated autonomous vehicle can occupy a target lane of the lane-change maneuver and slow down as it approaches the occluded autonomous vehicle, thereby creating an opening in the target lane for the occluded autonomous vehicle. The designated autonomous vehicle can provide an indication to the occluded autonomous vehicle when it is safe for the occluded autonomous vehicle to execute the lane-change maneuver. As another example, if an unprotected-left-turn maneuver of an autonomous vehicle is occluded, then a designated autonomous vehicle can approach a geographic location of the unprotected-left-turn maneuver in the opposing lane of the occluded autonomous vehicle and slow down as it approaches the occluded autonomous vehicle, thereby creating an opening in the opposing lane for the occluded autonomous vehicle. The designated autonomous vehicle can provide an indication to the occluded autonomous vehicle when it is safe for the occluded autonomous vehicle to execute the unprotected-left-turn maneuver across the opposing lane. In some implementations, the designated autonomous vehicle can approach the occlusion point (e.g., a hill block area) from another direction than the occluded vehicle and provide a communication to the occluded autonomous vehicle that the occluded vehicle can proceed safely (e.g., despite its lack of view of a particular region over the hill).

The occluded autonomous vehicle can obtain data corresponding to one or more occluded region(s) and/or an indication of when it is safe to execute an occluded maneuver, and adjust its motion plan accordingly. For example, data obtained by a designated autonomous vehicle can indicate that the occluded region(s) do not contain any object(s) that can adversely affect the occluded autonomous vehicle (e.g., other vehicle(s), pedestrian(s), road hazard(s), etc.). In this case, the occluded autonomous vehicle can safely execute an occluded maneuver and navigate past the occlusion point. As another example, data obtained by a designated autonomous vehicle can indicate that an occluded region contains an object that can adversely affect the autonomous vehicle. In this case, the designated autonomous vehicle can obtain and provide data indicating an identity of the object and a geographic location of the object. As another example, if an occluded region includes a moving vehicle, data provided to an occluded autonomous vehicle can include a trajectory of the moving vehicle. As another example, if an occluded region includes a construction crew performing repair work, the data can include a duration or end time of the repair work. The occluded autonomous vehicle can determine one or more avoidance maneuver(s) to avoid an object in an occluded region, and execute the avoidance maneuver(s) to safely navigate past the occlusion point. For example, if an occluded region contains a duck and her ducklings crossing a street, an occluded autonomous vehicle can execute a waiting maneuver to wait for the duck and her ducklings to finish crossing. Alternatively, a designated autonomous vehicle can indicate when the duck and her duckling finish crossing and it is safe for the occluded autonomous vehicle to perform an occluded maneuver. As another example, if an occluded region includes a road closure, then an occluded autonomous vehicle can determine and execute one or more maneuver(s) to follow a detour route to safely navigate past the occlusion point. In this way, an occluded autonomous vehicle can plan its motion to safely navigate past the occlusion point based at least in part on data obtained by a designated autonomous vehicle.

A computing system can deploy a designated autonomous vehicle to preclude an occlusion point corresponding to an occluded autonomous vehicle. For example, if an occlusion point indicates that a parked truck at an intersection occludes one or more sensor(s) of an autonomous vehicle, then a computing system can deploy a designated autonomous vehicle to monitor the geographic location (e.g., parking space) of the truck. When the location is empty, the designated autonomous vehicle can execute a parking maneuver to occupy the space. The designated autonomous vehicle can obtain data indicative of a surrounding environment at the location so that the occluded autonomous vehicle can safely execute an occluded maneuver and navigate past the occlusion point.

The systems and methods described herein provide a number of technical effects and benefits. Systems and methods for implementing autonomous navigation by deploying a designated autonomous vehicle to oversee maneuver(s) of an autonomous vehicle can have a technical effect of improving efficiency in resource management. By enabling the autonomous vehicle, or another computing system, to deploy a designated autonomous vehicle to an occlusion point, and prioritizing an unoccupied autonomous vehicle (e.g., not providing a vehicle service) when selecting the designated autonomous vehicle, the unoccupied autonomous vehicle can assist the autonomous vehicle to reach its destination, rather than the unoccupied autonomous vehicle idling. This can allow the autonomous vehicle to reach its destination sooner instead of waiting for an occlusion point to go away or taking a detour around the occlusion point.

Additionally, by enabling an autonomous vehicle to share one or more identified occlusion points with one or more other autonomous vehicle(s), each autonomous vehicle can benefit from the sensor data of the other autonomous vehicle(s). This allows the autonomous vehicles to obtain a more holistic snapshot of the geographic area surrounding each autonomous vehicle, thereby enabling the autonomous vehicles to make more informed and efficient navigation decisions.

The systems and methods of the present disclosure also provide an improvement to vehicle computing technology, such as autonomous vehicle computing technology. For instance, the systems and methods herein enable the vehicle technology to automatically request assistance for executing an autonomous navigation maneuver. For example, the systems and methods can allow one or more computing system(s) on-board an autonomous vehicle (and/or off-board a vehicle) to predict/identify occluded region(s) in a surrounding environment of the autonomous vehicle. As described herein, an autonomous vehicle can be configured to provide data indicative of the occluded region(s) to one or more other autonomous vehicle(s), and to request assistance with respect to the occlude region(s). Ultimately, the autonomous vehicle can plan its motion according to data received by another autonomous vehicle with respect to an occluded region. This allows the autonomous vehicle to more effectively and safely perform autonomous navigation.

Example Embodiments

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 103. The system 100 can also include one or more additional vehicle(s) 105, each including a respective vehicle computing system (not shown).

In some implementations, the system 100 can include one or more remote computing system(s) 104 that are remote from the vehicle 103 and the additional vehicle(s) 105. The remote computing system(s) 104 can include an operations computing system 120, traffic/weather information system 122, and map information system 124. The remote computing system(s) 104 can be separate from one another or share computing device(s). The operations computing system 120 can remotely manage the vehicle 103 and/or additional vehicle(s) 105. The traffic/weather information system 122 and map information system 124 can be information servers that can provide detailed information about the surrounding environment of the vehicle 103. For example, the traffic/weather information system 122 can include and provide information regarding: traffic data (e.g., the location and instructions of signage, traffic lights, other traffic control devices, traffic patterns, traffic alerts); and weather data (e.g., the location and duration of inclement weather, general weather conditions). The map information system 124 can include map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); and/or any other data that provides information that assists the vehicle 103 in comprehending and perceiving its surrounding environment and its relationship thereto.

The vehicle 103 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 103 can be an autonomous vehicle that can drive, navigate, operate, etc. with minimal and/or no interaction from a human driver. For instance, the vehicle 103 can be configured to operate in a plurality of operating modes. The vehicle 103 can be configured to operate in a fully autonomous (e.g., self-driving) operating mode in which the vehicle 103 can drive and navigate with no input from a user present in the vehicle 103. The vehicle 103 can be configured to operate in a semi-autonomous operating mode in which the vehicle 103 can operate with some input from a user present in the vehicle 103. In some implementations, the vehicle 103 can enter into a manual operating mode in which the vehicle 103 is fully controllable by a user (e.g., human operator) and can be prohibited from performing autonomous navigation (e.g., autonomous driving).

The vehicle computing system 102 can include one or more computing device(s) located on-board the vehicle 103 (e.g., located on and/or within the vehicle 103). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 103 (e.g., its computing system, one or more processors, etc.) to perform operations and functions, such as those described herein.

As shown in FIG. 1, the vehicle 103 can include one or more sensors 108, an autonomy computing system 110, vehicle control system 112, communications system 114, and memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 103 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 103. The sensor data 109 can be indicative of locations associated with the object(s) within the surrounding environment of the vehicle 103 at one or more times. The sensor(s) 108 can provide the sensor data 109 to the autonomy computing system 110.

Figure 2:
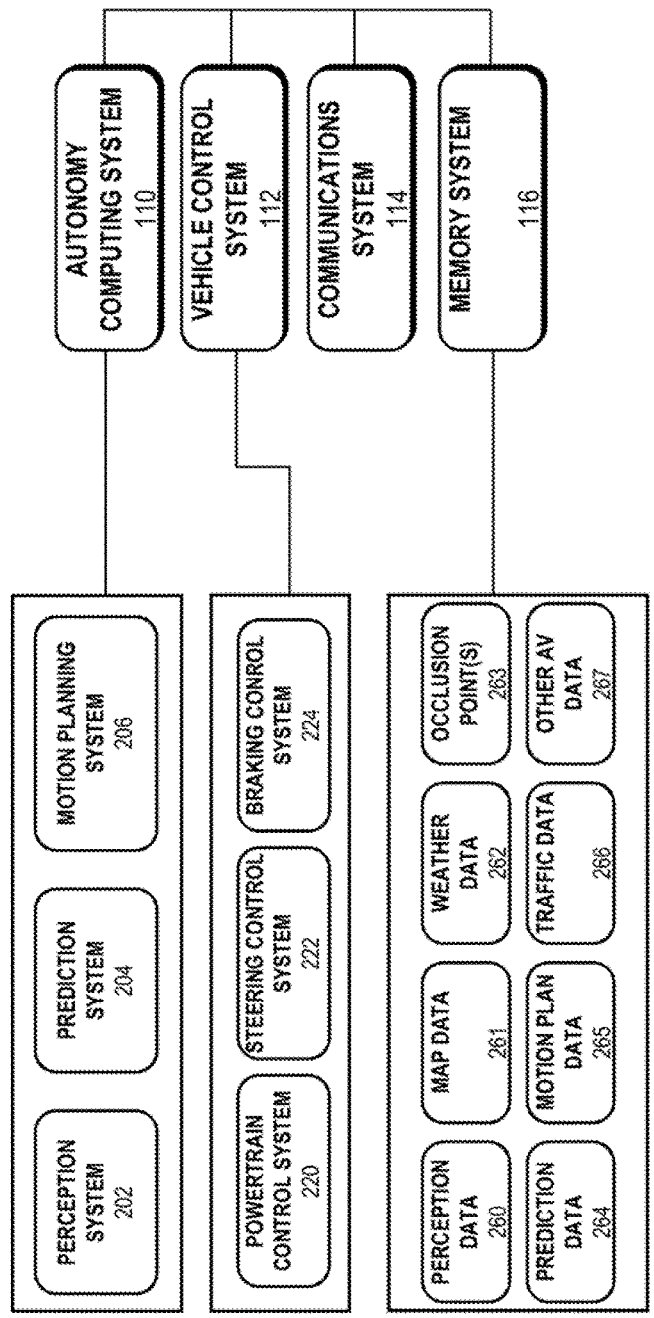
FIG. 2 depicts an example vehicle computing system for controlling an autonomous vehicle according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 103 and determine a motion plan for controlling the motion of the vehicle 103 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. As another example, the autonomy computing system 110 can obtain traffic/weather data and map data from the traffic/weather information system 122 and map information system 124, respectively, to assist in comprehending and perceiving its surrounding environment and its relationship thereto. The autonomy computing system 110 can control the one or more vehicle control systems 112 to operate the vehicle 103 according to the motion plan.

The autonomy computing system 110 can identify one or more objects that are proximate to the vehicle 103 based at least in part on the sensor data 109 and/or the map data 261. For example, the perception system 202 can obtain perception data 260 descriptive of a current state of an object that is proximate to the vehicle 103. The perception data 260 for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. In some implementations, the perception system 202 can determine perception data 260 for each object over a number of iterations. In particular, the perception system 202 can update the perception data 260 for each object at each iteration. Thus, the perception system 202 can detect and track objects (e.g., vehicles, pedestrians, bicycles, and the like) that are proximate to the autonomous vehicle 103 over time. The perception system 202 can provide the perception data 260 to the prediction system 204 (e.g., for predicting the movement of an object).

The prediction system 204 can create predicted data 264 associated with each of the respective one or more objects proximate to the vehicle 103. The predicted data 264 can be indicative of one or more predicted future locations of each respective object. The predicted data 264 can be indicative of a predicted path (e.g., predicted trajectory) of at least one object within the surrounding environment of the vehicle 103. For example, the predicted path (e.g., trajectory) can indicate a path along which the respective object is predicted to travel over time (and/or the speed at which the object is predicted to travel along the predicted path). The prediction system 204 can provide the predicted data 264 associated with the object(s) to the motion planning system 206.

The motion planning system 206 can determine a motion plan for the vehicle 103 based at least in part on the predicted data 264 (and/or other data), and save the motion plan as motion plan data 265. The motion plan data 265 can include vehicle actions with respect to the objects proximate to the vehicle 103 as well as the predicted movements. For instance, the motion planning system 206 can implement an optimization algorithm that considers cost data associated with a vehicle action as well as other objective functions (e.g., based on speed limits, traffic lights, etc.), if any, to determine optimized variables that make up the motion plan data 265. By way of example, the motion planning system 206 can determine that the vehicle 103 can perform a certain action (e.g., pass an object) without increasing the potential risk to the vehicle 103 and/or violating any traffic laws (e.g., speed limits, lane boundaries, signage). The motion plan data 265 can include a planned trajectory, speed, acceleration, etc. of the vehicle 103.

The motion planning system 206 can provide at least a portion of the motion plan data 265 that indicates one or more vehicle actions, a planned trajectory, and/or other operating parameters to the vehicle control system(s) 112 to implement the motion plan for the vehicle 103. For instance, the vehicle 103 can include a mobility controller configured to translate the motion plan data 265 into instructions. By way of example, the mobility controller can translate the motion plan data 265 into instructions to adjust the steering of the vehicle 103 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with other computing systems (e.g., remote computing system(s) 104, additional vehicles 105). The vehicle computing system 102 can use the communications system 114 to communicate with the operations computing system 104 and/or one or more other remote computing system(s) over one or more networks (e.g., via one or more wireless signal connections). In some implementations, the communications system 114 can allow communication among one or more of the system(s) on-board the vehicle 103. The communications system 114 can include any suitable sub-systems for interfacing with one or more network(s), including, for example, transmitters, receivers, ports, controllers, antennas, and/or other suitable sub-systems that can help facilitate communication.

The memory system 116 of the vehicle 103 can include one or more memory devices located at the same or different locations (e.g., on-board the vehicle 103, distributed throughout the vehicle 103, off-board the vehicle 103, etc.). The vehicle 103 can use the memory system 116 to store and retrieve data/information. For instance, the memory system 116 can store perception data 260, map data 261, weather data 262, occlusion point(s) 263, prediction data 264, motion plan data 265, traffic data 266, and other autonomous vehicle data 267.

The other autonomous vehicle data (other AV data) 267 can include information corresponding to one or more characteristics of one or more additional vehicles 105. For example, the other AV data 267 can indicate one or more of a vehicle route, motion plan, occupancy, geographic location, or vehicle type corresponding to one or more of the additional vehicles 105. A designated autonomous vehicle can be selected among the additional vehicles 105 based at least in part on the data obtained and stored in other AV data 267.

Figure 3A:
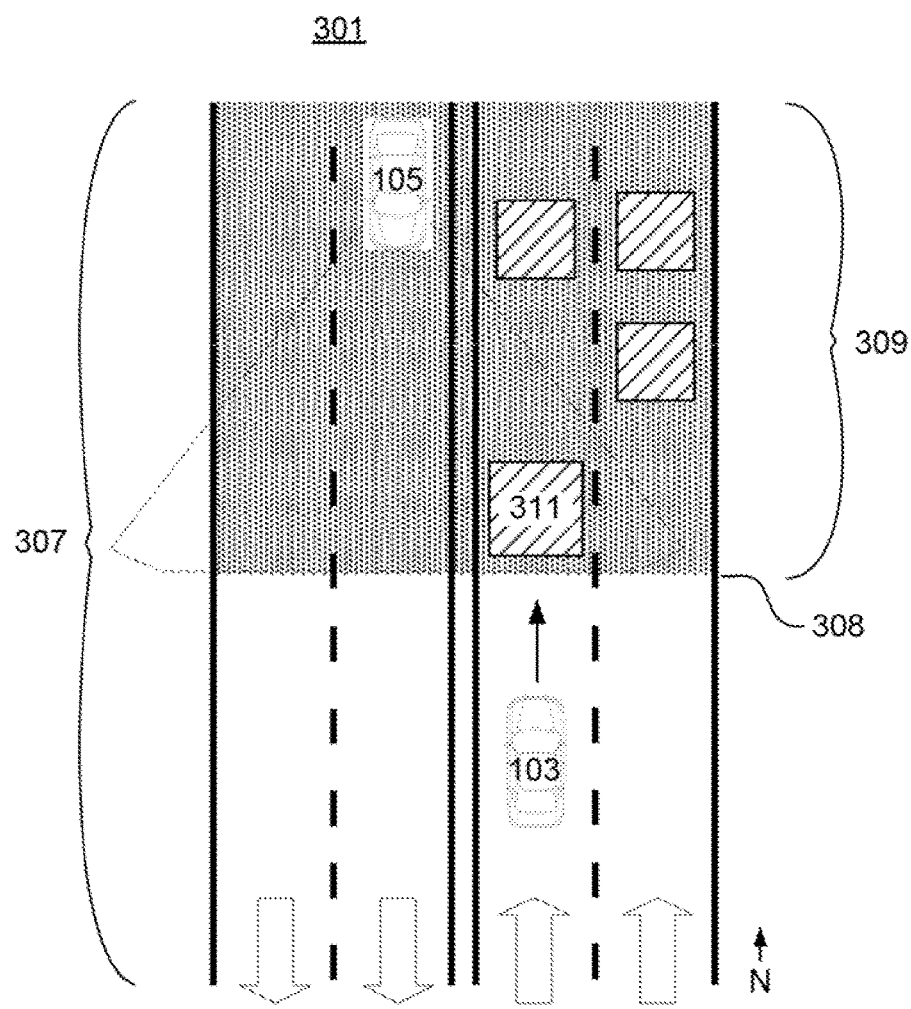
FIGS. 3A and 3B depict diagrams illustrating an example of controlling an autonomous vehicle according to example embodiments of the present disclosure.
Figure 3B:
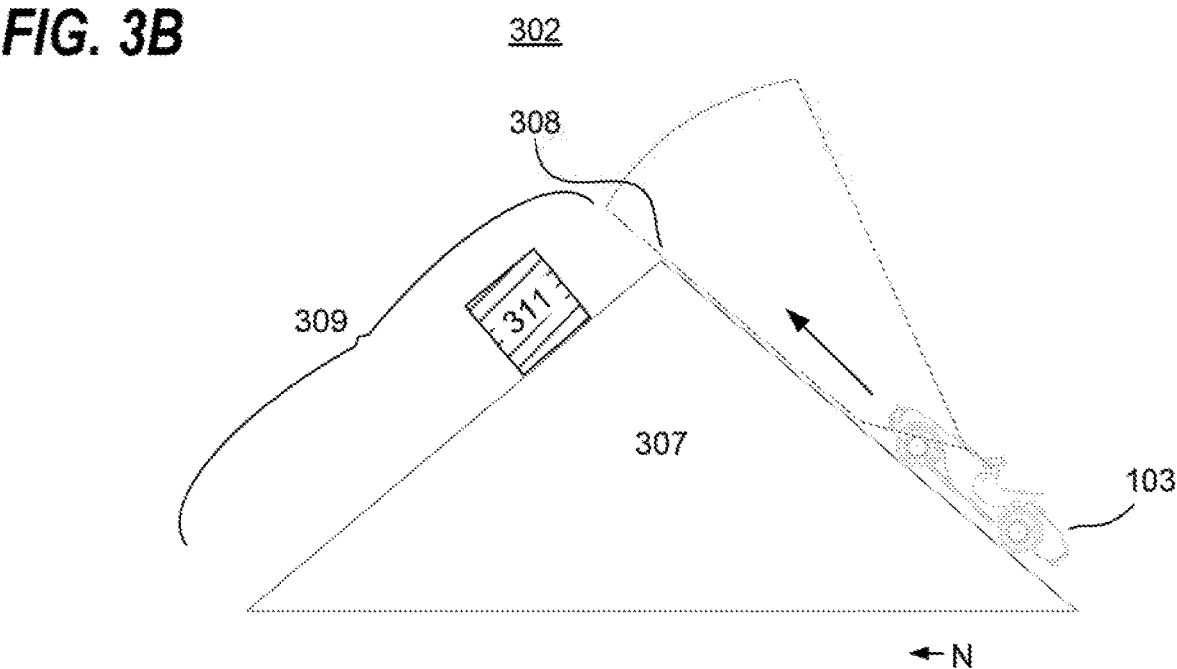

FIGS. 3A and 3B depict diagrams 301 and 302 that illustrates an example of deploying a designated autonomous vehicle to assist an occluded autonomous vehicle safely navigate past an occlusion point. As shown in FIGS. 3A and 3B, a motion plan of vehicle 103 (e.g., occluded autonomous vehicle) can include a maneuver instructing the vehicle 103 to travel over hill 307 with apex 308. A computing system (e.g., vehicle computing system 102, remote computing system(s) 104, computing systems of additional vehicle(s) 105) can determine that hill 307 is an occlusion point because when the vehicle 103 is climbing the hill 307 from south of the apex 308, the hill 307 can occlude the region 309 north of the apex 308 from the sensor(s) 108 on-board the vehicle 103. The computing system can select and deploy additional vehicle 105 (e.g., designated autonomous vehicle) to observe the occluded region 309 to assist vehicle 103 to safely navigate past the hill 307. The additional vehicle 105 can be deployed such that the additional vehicle 105 can obtain data indicative of the occluded region 309 (e.g., via one or more sensor(s) on-board additional vehicle 105). The additional vehicle 105 can provide the data indicative of occluded region 309 to the vehicle 103 (e.g., directly, indirectly via another system, etc.). The vehicle 103 can obtain the data indicative of the occluded region 309 from the additional vehicle 105, and determine that the occluded region 309 includes object(s) 311. The vehicle 103 can adjust its motion plan to avoid a collision with the object(s) 311, and safely navigate past the hill 307. For example, the vehicle 103 can slow down as the vehicle 103 approaches the apex 308, and/or execute a lane-change maneuver before approaching the apex 308.

Figure 4:
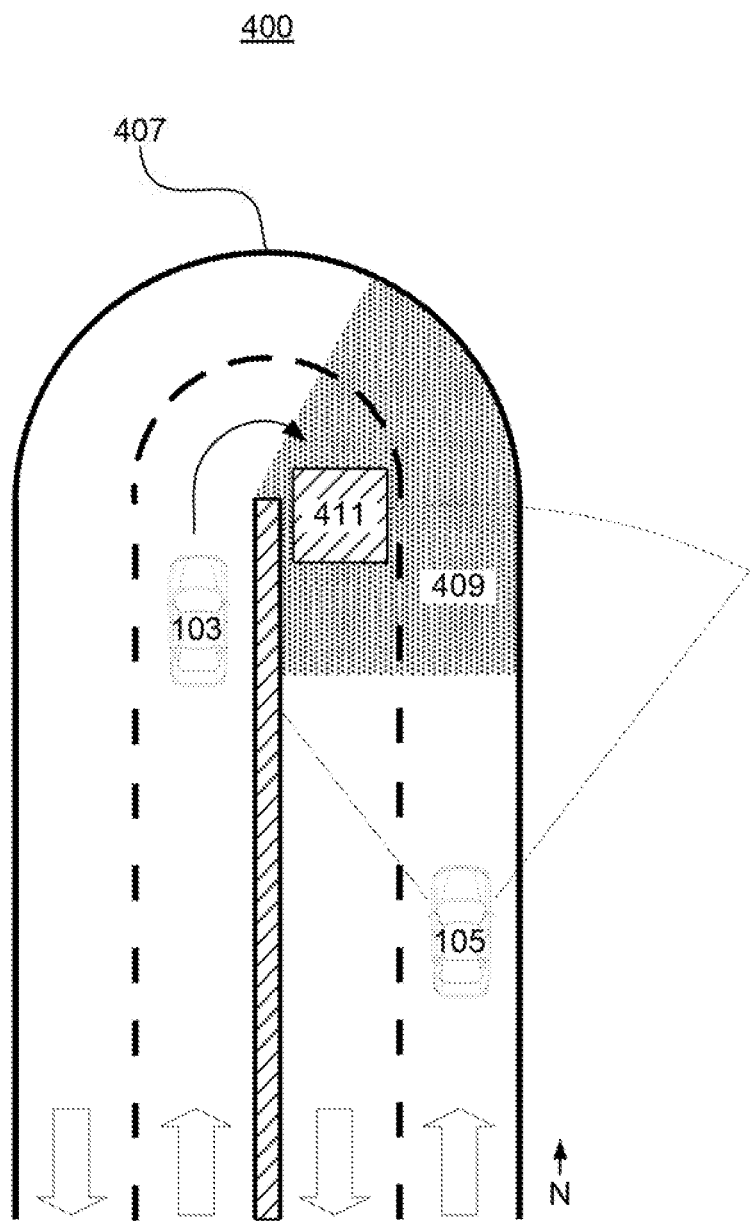
FIG. 4 depicts a diagram illustrating an example of controlling an autonomous vehicle according to example embodiments of the present disclosure.

FIG. 4 depicts a diagram 400 that illustrates an example of deploying a designated autonomous vehicle to assist an occluded autonomous vehicle to safely navigate past an occlusion point. As shown in FIG. 4, a motion plan of vehicle 103 (e.g., occluded autonomous vehicle) can include a maneuver instructing the autonomous vehicle to travel around blind-corner 407. A computing system (e.g., of the vehicle 103, of the remote computing system(s) 104, of the additional vehicle(s) 105) can determine that the blind-corner 407 is an occlusion point because when the vehicle 103 is turning the blind-corner 407, the region 409 is occluded to the sensor(s) 108 on-board the vehicle 103. The computing system can select and deploy additional vehicle 105 (e.g., designated autonomous vehicle) to observe the occluded region 409 to assist vehicle 103 to safely navigate past the blind-corner 407. The additional vehicle 105 can be deployed such that the additional vehicle 105 can obtain data indicative of the occluded region 409 (e.g., via one or more sensor(s) on-board additional vehicle 105). The additional vehicle 105 can provide the data indicative of occluded region 409 to the vehicle 103. The vehicle 103 can obtain the data indicative of the occluded region 409 from the additional vehicle 105, and determine that the occluded region 409 includes object(s) 411. The vehicle 103 can adjust its motion plan to avoid a collision with object(s) 411, and safely navigate past the blind-corner 407. For example, the vehicle 103 can slow down and/or nudge as the vehicle 103 turns the blind-corner 407.

Figure 5A:
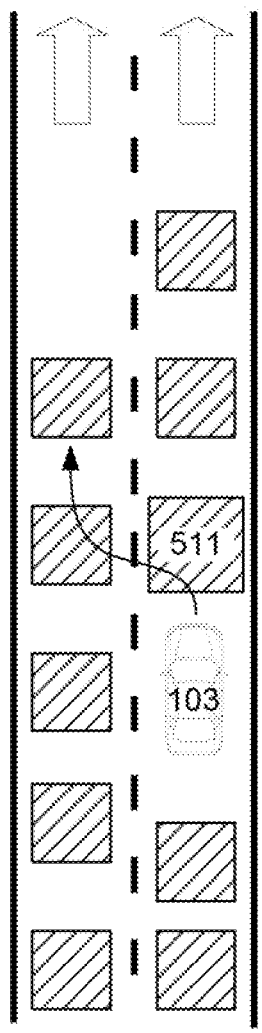
FIGS. 5A and 5B depict diagrams illustrating an example of controlling an autonomous vehicle according to example embodiments of the present disclosure.
Figure 5B:
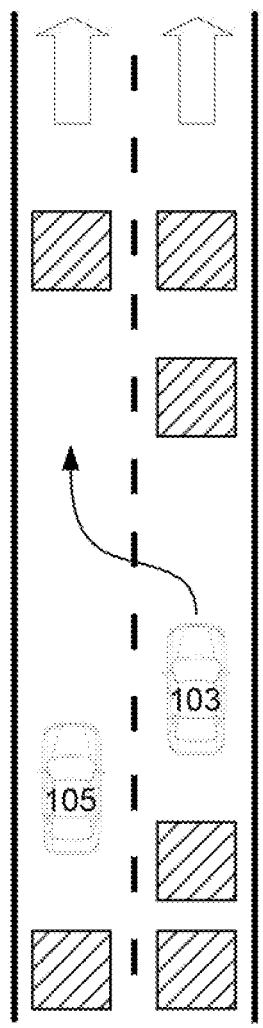

FIGS. 5A and 5B depict diagrams 501 and 502 that illustrate an example of deploying a designated autonomous vehicle to assist an occluded autonomous vehicle to safely navigate past an occlusion point. As shown in FIG. 5A, a motion plan of vehicle 103 (e.g., occluded autonomous vehicle) can include a maneuver instructing the autonomous vehicle to execute a lane-change. A computing system (e.g., of the vehicle 103, of the remote computing system(s) 104, of the additional vehicle(s) 105) can determine that the lane-change maneuver is occluded by one or more object(s) 511. As shown in FIG. 5B, the computing system can select and deploy additional vehicle 105 (e.g., designated autonomous vehicle) to provide a leeway for the vehicle 103 to safely execute the lane-change maneuver. For example, the additional vehicle 105 can occupy the target lane of the lane-change maneuver and slow down as it approaches the location of the lane-change maneuver, thereby creating an opening in the target lane for the vehicle 103 to execute the lane-change maneuver.

Figure 6B:
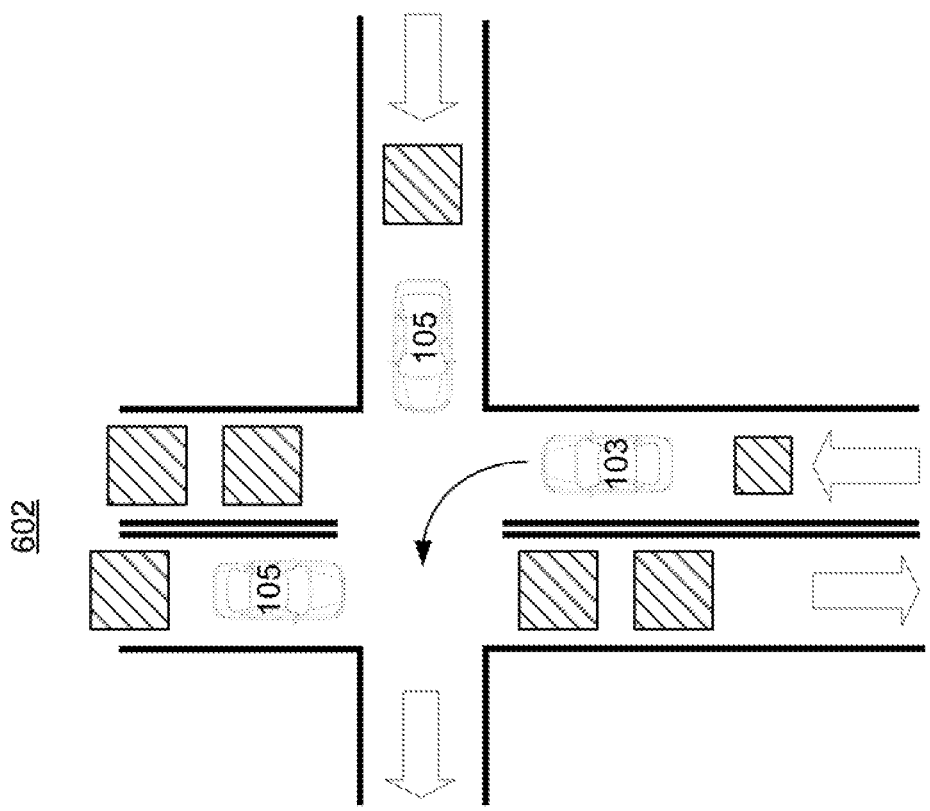
FIGS. 6A and 6B depict diagrams illustrating an example of controlling an autonomous vehicle according to example embodiments of the present disclosure.
Figure 6A:
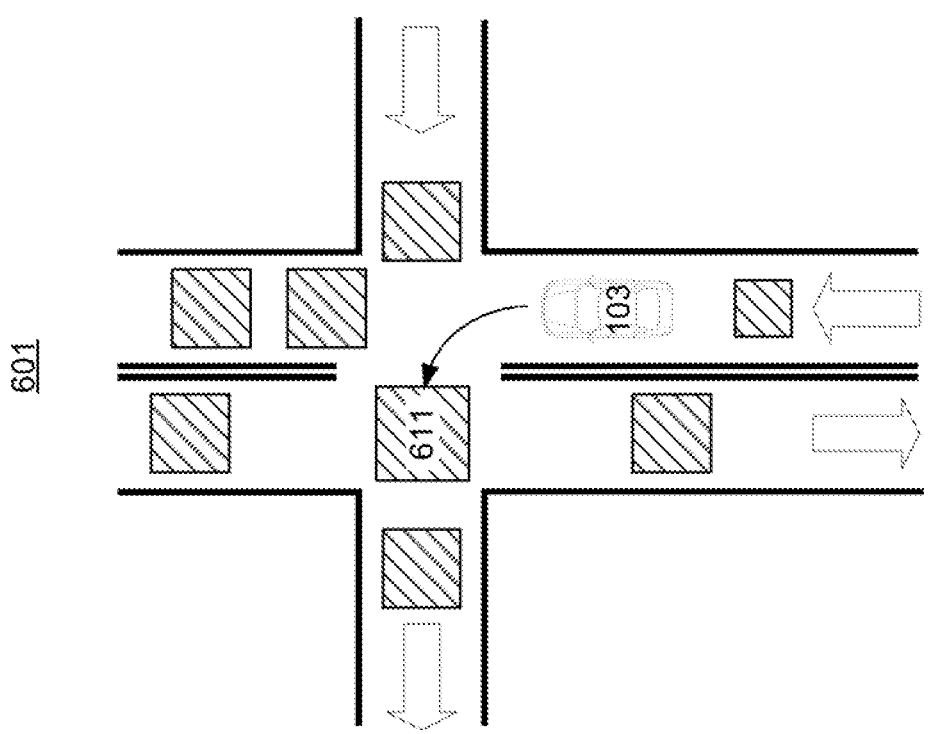

FIGS. 6A and 6B depict diagrams 601 and 602 that illustrate an example of deploying a designated autonomous vehicle to assist an occluded autonomous vehicle to safely navigate past an occlusion point. As shown in FIG. 6A, a motion plan of vehicle 103 (e.g., occluded autonomous vehicle) can include a maneuver instructing the autonomous vehicle to execute an unprotected-left-turn. A computing system (e.g., of the vehicle 103, of the remote computing system(s) 104, of the additional vehicle(s) 105) can determine that the unprotected-left-turn maneuver is occluded by one or more object(s) 611. As shown in FIG. 6B, the computing system can select and deploy additional vehicle(s) 105 (e.g., designated autonomous vehicle(s)) to provide a leeway for the vehicle 103 to safely execute the unprotected-left-turn maneuver. For example, the additional vehicle(s) 105 can occupy an opposing lane and a target lane corresponding to the unprotected-left-turn maneuver, and slow down as the additional vehicle(s) 105 approach the location of the unprotected-left-turn maneuver, thereby creating an opening for the vehicle 103 to execute the unprotected-left-turn maneuver.

Figure 7:
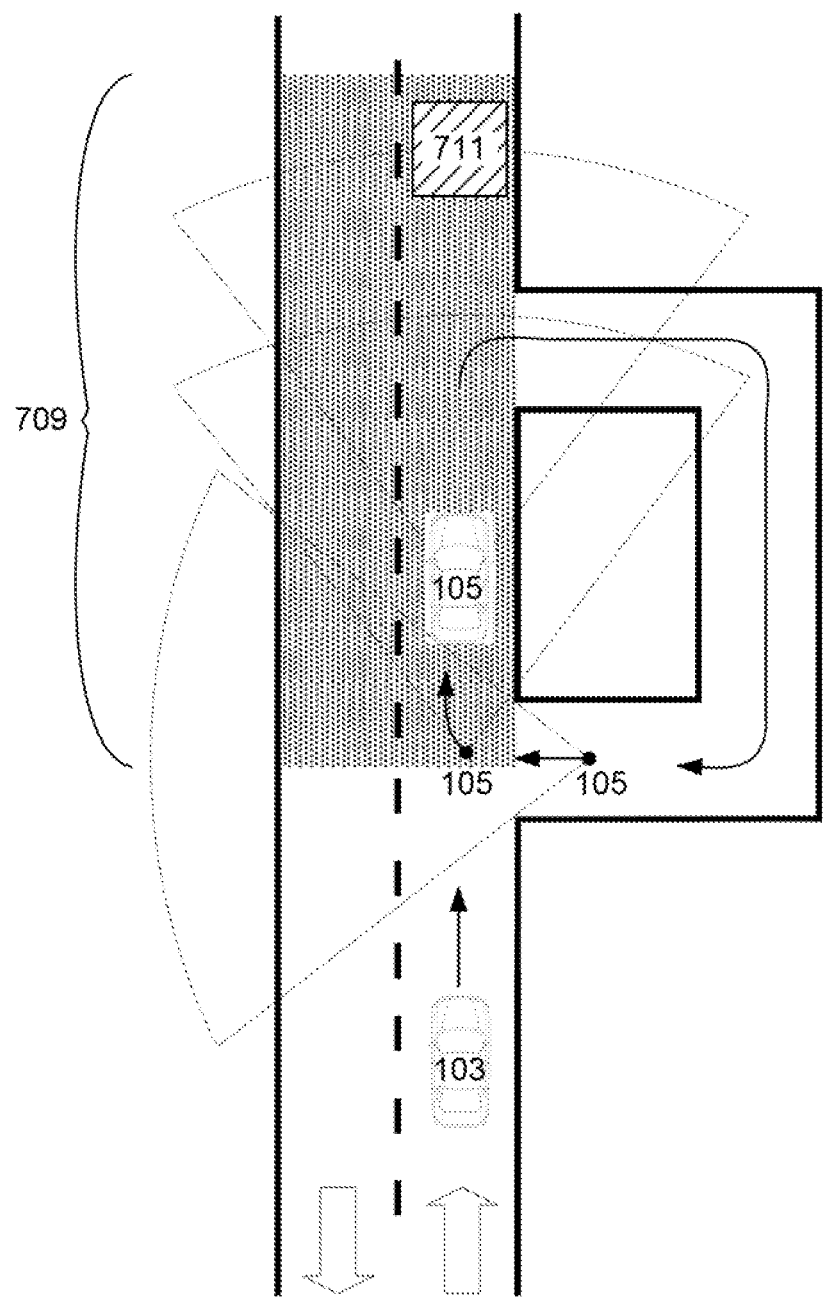
FIG. 7 depicts a diagram illustrating an example of controlling an autonomous vehicle according to example embodiments of the present disclosure.

FIG. 7 depicts a diagram 700 that illustrates an example of deploying a designated autonomous vehicle to assist an occluded autonomous vehicle to safely navigate past an occlusion point. As shown in FIG. 7, a motion plan of vehicle 103 (e.g., occluded autonomous vehicle) can include a maneuver instructing the autonomous vehicle to travel through occluded region 709. A computing system (e.g., of the vehicle 103, of the remote computing system(s) 104, of the additional vehicle(s) 105) can determine that the occluded region 709 is an occlusion point because precipitation in the occluded region 709 occludes the sensor(s) 108 on-board the vehicle 103. The computing system can select and deploy additional vehicle 105 (e.g., designated autonomous vehicle) to observe the occluded region 709 to assist vehicle 103 to safely navigate past the occluded region 709. The additional vehicle 105 can be deployed to patrol the occluded region 709 and obtain data indicative of the occluded region 709 (e.g., via one or more sensor(s) on-board additional vehicle 105). The additional vehicle 105 can provide the data indicative of occluded region 709 to the vehicle 103. The vehicle 103 can obtain the data indicative of the occluded region 709 from the additional vehicle 105 (e.g., directly, indirectly), and determines that the occluded region 709 includes object(s) 711. The vehicle 103 adjusts its motion plan to avoid a collision with object(s) 711, and safely navigate past occluded region 709. For example, the vehicle 103 can slow down as the vehicle 103 approaches the object(s) 711.

Figure 8:
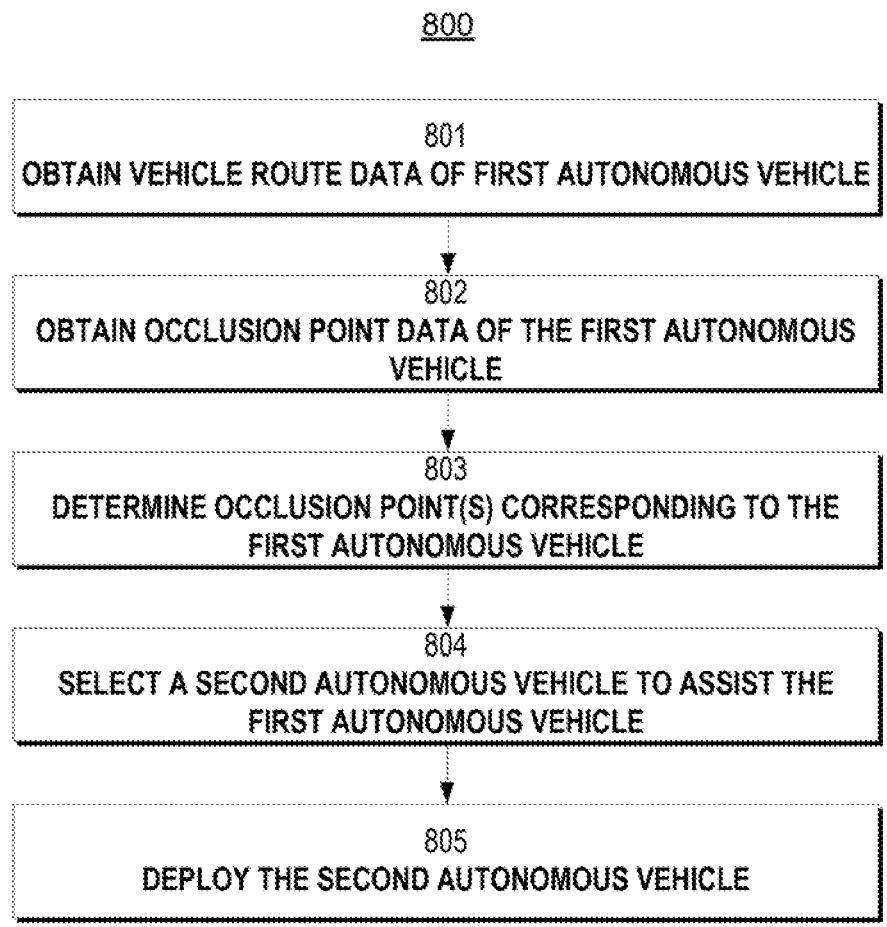
FIG. 8 depicts a flow diagram of controlling an autonomous vehicle according to example embodiments of the present disclosure.

FIG. 8 depicts a flow diagram of an example method 800 of deploying a designated autonomous vehicle to assist an occluded autonomous vehicle to safely navigate past an occlusion point, according to example embodiments of the present disclosure. One or more portion(s) of the method 800 can be implemented as operations by one or more computing system(s) such as, for example, the computing system(s) 102, 200, 901 shown in FIGS. 1, 2, and 9. Moreover, one or more portion(s) of the method 800 can be implemented as an algorithm on the hardware components of the system(s) described herein (e.g., as in FIGS. 1, 2, and 9) to, for example, deploy a designated autonomous vehicle to assist an occluded autonomous vehicle to safely navigate past an occlusion point. FIG. 8 depicts elements performed in a particular order for purposes of illustration and discussion. Those of ordinary skill in the art, using the disclosures provided herein, will understand that the elements of any of the methods (e.g., of FIG. 8) discussed herein can be adapted, rearranged, expanded, omitted, combined, and/or modified in various ways without deviating from the scope of the present disclosure.

At (801), the method 800 can include obtaining vehicle route data of a first autonomous vehicle. For example, a computing system (e.g., vehicle computing system 102 associated with vehicle 103, remote computing system(s) 104, and/or a vehicle computing system associated with one of vehicle(s) 105) can obtain data representing a vehicle route of the first autonomous vehicle (e.g., vehicle 103). The first autonomous vehicle can travel along the vehicle route from a first location to a second location.

At (802), the method 800 can include obtaining occlusion point data of the first autonomous vehicle. For example, the computing system 103/104/105 can obtain data representing an occlusion point that affects an operation of the vehicle 103 along the vehicle route. In some implementations, the occlusion point can include one or more geographic locations along the vehicle route where the vehicle 103 is occluded by one or more objects in a surrounding environment of the vehicle 103. In some implementations, the data representing the occlusion point is determined based on (at least in part) (i) sensor data acquired by one or more sensors on-board the vehicle 103 or (ii) sensor data acquired by one or more sensors on-board a second autonomous vehicle (e.g., additional vehicle(s) 105) or (iii) sensor data acquired by one or more sensors on-board another autonomous vehicle (e.g., additional vehicle(s) 105). In some implementations, obtaining the data representing the occlusion point can include obtaining data representing the occlusion point identified by the additional vehicle(s) 105. In some implementations, obtaining the data representing the occlusion point can include obtaining data indicative of the occlusion point from a memory (e.g., memory system 116) accessible to the computing system 103/104/105.

At (803), the method 800 can include determining one or more occlusion point(s) corresponding to the first autonomous vehicle. For example, the computing system 103/104/105 can obtain data representing a motion plan of the vehicle 103. The motion plan can include one or more maneuvers that, when executed, cause the vehicle 103 to travel along the vehicle route. The computing system 103/104/105 can determine an occluded maneuver, among the one or more maneuvers in the motion plan of the vehicle 103, that is occluded by one or more objects in a surrounding environment of the vehicle 103 along the vehicle route. The computing system 103/104/105 can then determine a geographic location corresponding to the occluded maneuver. In some implementations, the occlusion point(s) are predetermined. For example, the computing system 103/104/105 can store each determined occlusion point as occlusion point(s) 263 in the memory system 116.

At (804), the method 800 can include selecting a second autonomous vehicle to assist the first autonomous vehicle. For example, the other AV data 267 can indicate a position of the additional vehicle(s) 105, and the computing system 103/104/105 can select a second autonomous vehicle (e.g., vehicle 105) from among one or more second autonomous vehicles (e.g., additional vehicle(s) 105) located within a predetermined distance from the occlusion point. In some implementations, the computing system 103/104/105 can select the vehicle 105 based at least in part on (i) the vehicle route and (ii) the occlusion point. In some implementations, the computing system 103/104/105 can select the vehicle 105 based at least in part by prioritizing one or more of an unoccupied autonomous vehicle, a vehicle type different from a vehicle type of the first autonomous vehicle, or a time-to-deploy of the vehicle 105 from the one or more additional vehicle(s) 105 located within the predetermined distance from the occlusion point. For example, the other AV data 267 can indicate whether one or more of the additional vehicle(s) 105 is occupied or unoccupied. The computing system 103/104/105 can prioritize selecting a designated autonomous vehicle from the additional vehicle(s) 105 that is unoccupied. As another example, the other AV data 267 can include a vehicle type for one or more of the additional vehicle(s) 105. If a vehicle type of the vehicle 103 is a ground-based vehicle, the computing system 103/104/105 can prioritize selecting a designated autonomous vehicle from the additional vehicle(s) 105 that is an air-based vehicle. As yet another example, the other AV data 267 can include a time-to-deploy for one or more of the additional vehicle(s) 105. The computing system 103/104/105 can prioritize selecting a designated autonomous vehicle from the additional vehicle(s) 105 that has a shortest time-to-deploy.

At (805), the method 800 can include deploying the second autonomous vehicle. For example, the computing system 103/104/105 can deploy the vehicle 105 to assist the vehicle 103 to travel along the vehicle route. In some implementations, the computing system 103/104/105 can deploy the vehicle 105 to determine one or more objects in the surrounding environment. In some implementations, deploying the vehicle 105 can include providing a communication to cause the vehicle 105 to travel to a vicinity of the occlusion point. The vehicle 105 can travel to the vicinity of the occlusion point in response to receiving the communication. The computing system 103/104/105 can control the vehicle 105 to assist the vehicle 103 with respect to the occlusion point. In some implementations, controlling the vehicle 105 to assist the vehicle 103 can include controlling the vehicle 105 to obtain data indicative of an occluded region at the occlusion point, the occluded region being occluded to the vehicle 103 at the occlusion point but not being occluded to the vehicle 105. In some implementations, controlling the vehicle 105 to assist the vehicle 103 can include controlling the vehicle 105 to provide a leeway for the vehicle 103 at the occlusion point. In some implementations, controlling the vehicle 105 to assist the vehicle 103 can include providing a communication to cause the vehicle 105 to travel to a vicinity of the occlusion point. The communication can be provided to a remote computing system 104 that provides a second communication to the vehicle 105. The vehicle 105 can travel to the vicinity of the occlusion point in response to receiving the second communication. In some implementations, controlling the vehicle 105 to assist the vehicle 103 can include providing a communication to request the vehicle 105 to assist the vehicle 103 with respect to the occlusion point.

Figure 9:
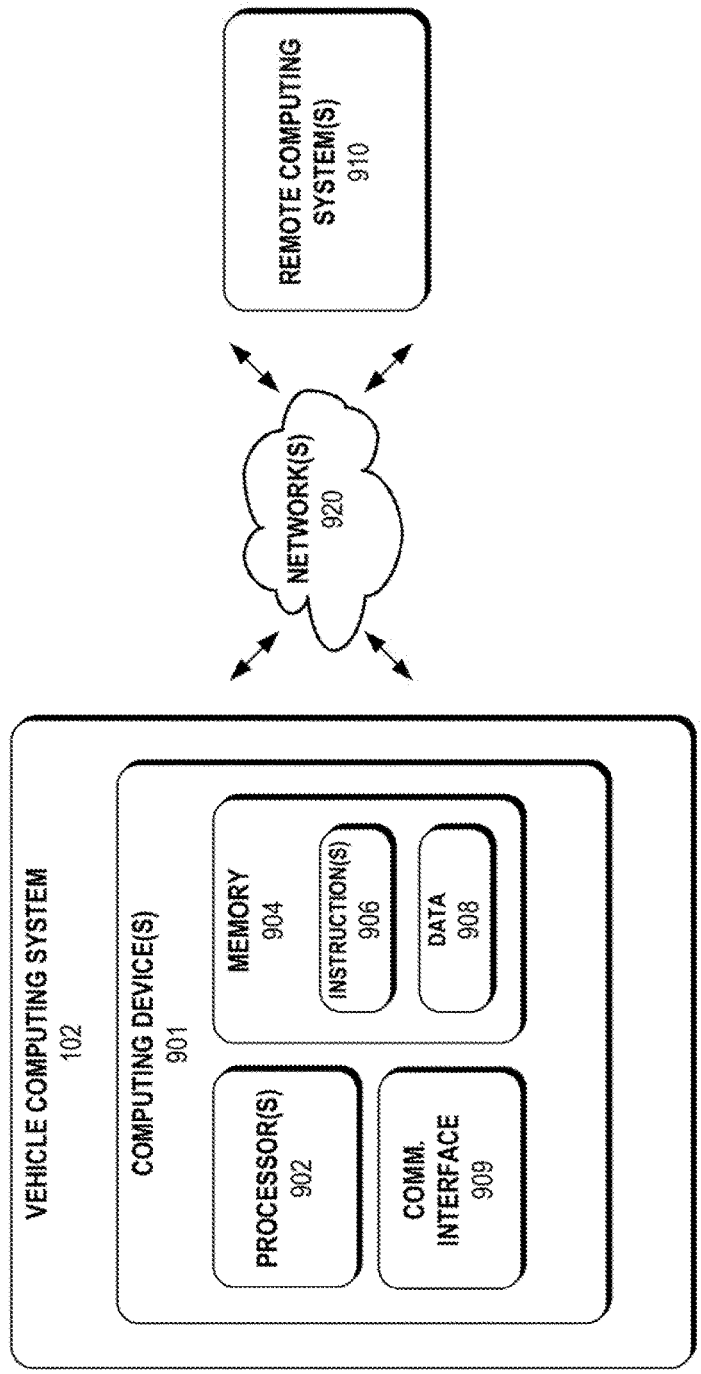
FIG. 9 depicts example system components according to example embodiments of the present disclosure.

FIG. 9 depicts an example computing system 900 according to example embodiments of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include the vehicle computing system 102 of the vehicle 103 and, in some implementations, a remote computing system(s) 910 including one or more remote computing system(s) that are remote from the vehicle 103 (e.g., the operations computing system 104) that can be communicatively coupled to one another over one or more networks 920. The remote computing system 910 can be associated with a central operations system and/or an entity associated with the vehicle 103 such as, for example, a vehicle owner, vehicle manager, fleet operator, service provider, etc.

The computing device(s) 901 of the vehicle computing system 102 can include processor(s) 902 and a memory 904. The one or more processors 902 can be any suitable processing device (e.g., a processor core, a microprocessor, an ASIC, a FPGA, a controller, a microcontroller, etc.) and can be one processor or a plurality of processors that are operatively connected. The memory 904 can include one or more non-transitory computer-readable storage media, such as RAM, ROM, EEPROM, EPROM, one or more memory devices, flash memory devices, etc., and combinations thereof.

The memory 904 can store information that can be accessed by the one or more processors 902. For instance, the memory 904 (e.g., one or more non-transitory computer-readable storage mediums, memory devices) on-board the vehicle 103 can include computer-readable instructions 906 that can be executed by the one or more processors 902. The instructions 906 can be software written in any suitable programming language or can be implemented in hardware. Additionally, or alternatively, the instructions 906 can be executed in logically and/or virtually separate threads on processor(s) 902.

For example, the memory 904 on-board the vehicle 103 can store instructions 906 that when executed by the one or more processors 902 on-board the vehicle 103 cause the one or more processors 902 (the vehicle computing system 102) to perform operations such as any of the operations and functions of the vehicle computing system 102, as described herein, one or more operations of method 800, and/or any other operations and functions of the vehicle 103, as described herein.

The memory 904 can store data 908 that can be obtained, received, accessed, written, manipulated, created, and/or stored. The data 908 can include, for instance, data associated with perception, prediction, motion plan, maps, weather, traffic, occlusion point(s), and other autonomous vehicle(s), and/or other data/information as described herein. In some implementations, the computing device(s) 901 can obtain data from one or more memory device(s) that are remote from the vehicle 103.

The computing device(s) 901 can also include a communication interface 909 used to communicate with one or more other system(s) on-board the vehicle 103 and/or a remote computing device that is remote from the vehicle 103 (e.g., of remote computing system 910). The communication interface 909 can include any circuits, components, software, etc. for communicating via one or more networks (e.g., 920). In some implementations, the communication interface 909 can include, for example, one or more of a communications controller, receiver, transceiver, transmitter, port, conductors, software, and/or hardware for communicating data.

The network(s) 920 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 920 can be accomplished, for instance, via a communication interface using any type of protocol, protection scheme, encoding, format, packaging, etc.

The remote computing system 910 can include one or more remote computing devices that are remote from the vehicle computing system 102. The remote computing devices can include components (e.g., processor(s), memory, instructions, data) similar to that described herein for the computing device(s) 901. Moreover, the remote computing system 910 can be configured to perform one or more operations of the operations computing system 104, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling an autonomous vehicle to assist another autonomous vehicle, the method comprising:
    obtaining, by a computing system comprising one or more computing devices, data representing a vehicle route of a first autonomous vehicle, wherein the first autonomous vehicle travels along the vehicle route from a first location to a second location;
    obtaining, by the computing system, data representing an identified occlusion point at a geographic location, the identified occlusion point corresponding to one or more regions at the geographic location where one or more sensors of the autonomous vehicle are unable to perceive the surrounding environment;
    accessing, by the computing system, a remote computing system storing autonomous vehicle (AV) data that comprises information corresponding to characteristics of a plurality of additional autonomous vehicles, the AV data comprising one or more of a vehicle route for each additional autonomous vehicle, a motion plan for each additional autonomous vehicle, occupancy status for each additional autonomous vehicle, geographic location for each additional autonomous vehicle, or vehicle type for each additional autonomous vehicle;
    selecting, by the computing system, and based at least in part on (i) the vehicle route, (ii) the identified occlusion point, and (iii) the AV data corresponding to the characteristics of the plurality of additional autonomous vehicles, a second autonomous vehicle from the plurality of additional autonomous vehicles to assist the first autonomous vehicle, wherein the second autonomous vehicle is selected from the plurality of additional autonomous vehicles based at least in part on a time-to-deploy the second autonomous vehicle to the identified occlusion point; and
    deploying, by the computing system, the second autonomous vehicle to assist the first autonomous vehicle to travel along the vehicle route;
    wherein deploying the second autonomous vehicle to assist the first autonomous vehicle comprises providing, by the computing system, a communication to cause the second autonomous vehicle to travel to a vicinity of the geographic location, wherein the second autonomous vehicle travels to the vicinity of the geographic location in response to receiving the communication.

2. The computer-implemented method of claim 1, wherein the data representing the identified occlusion point is determined based on (i) sensor data acquired by one or more sensors on-board the first autonomous vehicle or (ii) sensor data acquired by one or more sensors on-board the second autonomous vehicle or (iii) sensor data acquired by one or more sensors on-board another autonomous vehicle.

3. The computer-implemented method of claim 1, wherein obtaining the data representing the identified occlusion point comprises:
    obtaining data representing the identified occlusion point identified by the second autonomous vehicle or one or more other autonomous vehicles.

4. The computer-implemented method of claim 1, wherein obtaining the data representing the identified occlusion point comprises:
    obtaining, by the computing system, data indicative of the identified occlusion point from a memory accessible by the computing system, wherein the identified occlusion point is a predetermined occlusion point.

5. The computer-implemented method of claim 1, wherein the identified occlusion point comprises one or more geographic locations along the vehicle route where the first autonomous vehicle is occluded by one or more objects in a surrounding environment of the first autonomous vehicle.

6. The computer-implemented method of claim 1, wherein deploying the second autonomous vehicle to assist the first autonomous vehicle comprises:
    deploying the second autonomous vehicle to determine the one or more objects in a surrounding environment of the second autonomous vehicle at the geographic location.

7. The computer-implemented method of claim 1, further comprising:
    determining, by the computing system, one or more occlusion points corresponding to the first autonomous vehicle, wherein the determining comprises:
        obtaining data representing a motion plan of the first autonomous vehicle, the motion plan including one or more maneuvers that, when executed, cause the first autonomous vehicle to travel along the vehicle route;
        determining an occluded maneuver, among the one or more maneuvers in the motion plan of the first autonomous vehicle, that is occluded by one or more objects in a surrounding environment of the first autonomous vehicle along the vehicle route; and
        determining a geographic location corresponding to the occluded maneuver.

8. The computer-implemented method of claim 1, wherein:
    selecting the second autonomous vehicle to assist the first autonomous vehicle comprises selecting the second autonomous vehicle, from among one or more second autonomous vehicles located within a predetermined distance from the identified occlusion point; and
    deploying the second autonomous vehicle to assist the first autonomous vehicle comprises controlling the second autonomous vehicle to assist the first autonomous vehicle with respect to the identified occlusion point.

9. The computer-implemented method of claim 8, wherein the second autonomous vehicle is further selected based at least in part by prioritizing one or more of an unoccupied autonomous vehicle or a vehicle type different from a vehicle type of the first autonomous vehicle.

10. The computer-implemented method of claim 8, wherein controlling the second autonomous vehicle to assist the first autonomous vehicle comprises:
controlling the second autonomous vehicle to obtain data indicative of an occluded region of an environment at the identified occlusion point, the occluded region being occluded to the first autonomous vehicle at the identified occlusion point but not being occluded to the second autonomous vehicle; and
controlling the second autonomous vehicle to provide the data indicative of the occluded region to the first autonomous vehicle when the first autonomous vehicle is in the vicinity of the geographic location associated with the identified occlusion point.

11. The computer-implemented method of claim 8, wherein controlling the second autonomous vehicle to assist the first autonomous vehicle comprises:
controlling the second autonomous vehicle to provide a leeway for the first autonomous vehicle at the identified occlusion point.

12. The computer-implemented method of claim 1, wherein deploying the second autonomous vehicle to assist the first autonomous vehicle comprises:
providing a communication to cause the second autonomous vehicle to travel to a vicinity of the identified occlusion point, wherein the communication is provided to a remote computing system that provides a second communication to the second autonomous vehicle, and the second autonomous vehicle travels to the vicinity of the identified occlusion point in response to receiving the second communication.

13. The computer-implemented method of claim 1, wherein deploying the second autonomous vehicle to assist the first autonomous vehicle comprises:
providing a communication to request the second autonomous vehicle to assist the first autonomous vehicle with respect to the identified occlusion point.

14. A computing system for controlling an autonomous vehicle assist another autonomous vehicle, the system comprising:
one or more processors; and
one or more tangible, non-transitory, computer readable media that collectively store instructions that when executed by the one or more processors cause the computing system to perform operations, the operations comprising:
obtaining data representing a vehicle route of a first autonomous vehicle, wherein the first autonomous vehicle travels along the vehicle route from a first location to a second location;
obtaining data representing an identified occlusion point at a geographic location, the identified occlusion point corresponding to one or more regions at the geographic location where one or more sensors of the autonomous vehicle are unable to perceive the surrounding environment;
accessing a remote computing system storing autonomous vehicle (AV) data that comprises information corresponding to characteristics of a plurality of additional autonomous vehicles, the AV data comprising one or more of a vehicle route for each additional autonomous vehicle, a motion plan for each additional autonomous vehicle, occupancy status for each additional autonomous vehicle, geographic location for each additional autonomous vehicle, or vehicle type for each additional autonomous vehicle;
selecting, based at least in part on (i) the vehicle route, (ii) the identified occlusion point, and (iii) the AV data corresponding to the characteristics of the plurality of additional autonomous vehicles, a second autonomous vehicle from the plurality of additional autonomous vehicles to assist the first autonomous vehicle, wherein the second autonomous vehicle is selected from the plurality of additional autonomous vehicles based at least in part on a time-to-deploy the second autonomous vehicle to the identified occlusion point; and
deploying the second autonomous vehicle to assist the first autonomous vehicle to travel along the vehicle route;
wherein deploying the second autonomous vehicle to assist the first autonomous vehicle comprises providing a communication to cause the second autonomous vehicle to travel to a vicinity of the geographic location, wherein the second autonomous vehicle travels to the vicinity of the geographic location in response to receiving the communication.

15. The computing system of claim 14, wherein:
selecting the second autonomous vehicle to assist the first autonomous vehicle comprises selecting the second autonomous vehicle, from among one or more second autonomous vehicles located within a predetermined distance from the identified occlusion point; and
deploying the second autonomous vehicle to assist the first autonomous vehicle comprises controlling the second autonomous vehicle to assist the first autonomous vehicle with respect to the identified occlusion point.

16. The computing system of claim 15, wherein controlling the second autonomous vehicle to assist the first autonomous vehicle comprises:
controlling the second autonomous vehicle to obtain data indicative of an occluded region at the identified occlusion point, the occluded region being occluded to the first autonomous vehicle at the identified occlusion point but not being occluded to the second autonomous vehicle.

17. The computing system of claim 15, wherein controlling the second autonomous vehicle to assist the first autonomous vehicle comprises:
controlling the second autonomous vehicle to provide a leeway for the first autonomous vehicle at the identified occlusion point.

18. An autonomous vehicle, comprising:
one or more processors; and
one or more tangible, non-transitory, computer readable media that collectively store instructions that when executed by the one or more processors cause the autonomous vehicle to perform operations, the operations comprising:
obtaining data representing a vehicle route of a first autonomous vehicle, wherein the first autonomous vehicle travels along the vehicle route from a first location to a second location;
obtaining data representing an identified occlusion point at a geographic location, the identified occlusion point corresponding to one or more regions at the geographic location where one or more sensors of the autonomous vehicle are unable to perceive the surrounding environment;

accessing a remote computing system storing autonomous vehicle (AV) data that comprises information corresponding to characteristics of a plurality of additional autonomous vehicles, the AV data comprising one or more of a vehicle route for each additional autonomous vehicle, a motion plan for each additional autonomous vehicle, occupancy status for each additional autonomous vehicle, geographic location for each additional autonomous vehicle, or vehicle type for each additional autonomous vehicle;

selecting, based at least in part on (i) the vehicle route, and (ii) the identified occlusion point, and (iii) the AV data corresponding to the characteristics of the plurality of additional autonomous vehicles, a second autonomous vehicle from the plurality of additional autonomous vehicles to assist the first autonomous vehicle, wherein the second autonomous vehicle is selected from the plurality of additional autonomous vehicles based at least in part on a time-to-deploy the second autonomous vehicle to the identified occlusion point; and deploying the second autonomous vehicle to assist the first autonomous vehicle to travel along the vehicle route;

wherein deploying the second autonomous vehicle to assist the first autonomous vehicle comprises providing a communication to cause the second autonomous vehicle to travel to a vicinity of the geographic location, wherein the second autonomous vehicle travels to the vicinity of the geographic location in response to receiving the communication.

19. The autonomous vehicle of claim 18, further comprising: determining one or more occlusion points corresponding to the first autonomous vehicle, wherein the determining comprises:

obtaining data representing a motion plan of the first autonomous vehicle, the motion plan including one or more maneuvers that, when executed, cause the first autonomous vehicle to travel along the vehicle route;

determining a maneuver, among the one or more maneuvers in the motion plan of the first autonomous vehicle, that is occluded by one or more objects in a surrounding environment of the first autonomous vehicle along the vehicle route; and determining a geographic location corresponding to the occluded maneuver.

20. The autonomous vehicle of claim 18, wherein deploying the second autonomous vehicle to assist the first autonomous vehicle comprises:

providing a communication to request the second autonomous vehicle to assist the first autonomous vehicle with respect to the identified occlusion point.

* * * * *